Patented Feb. 9, 1954

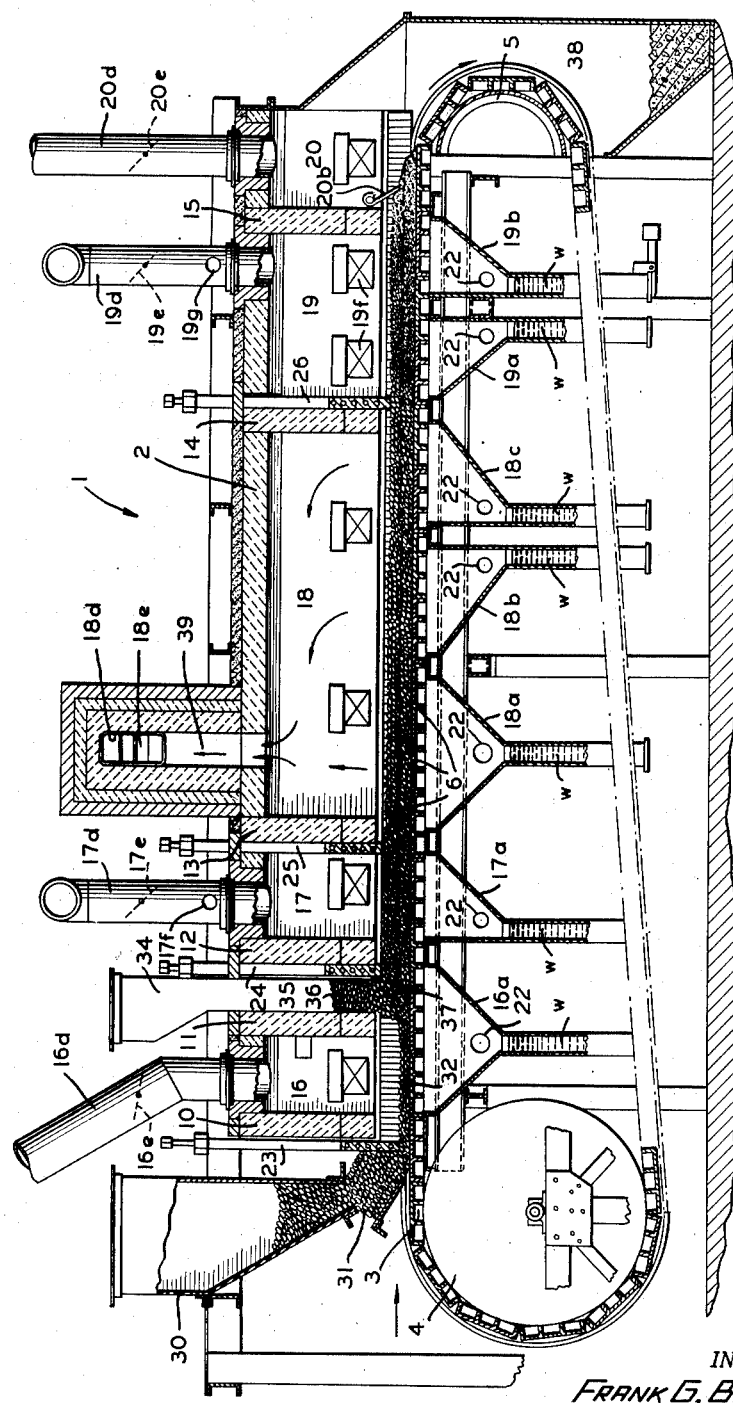

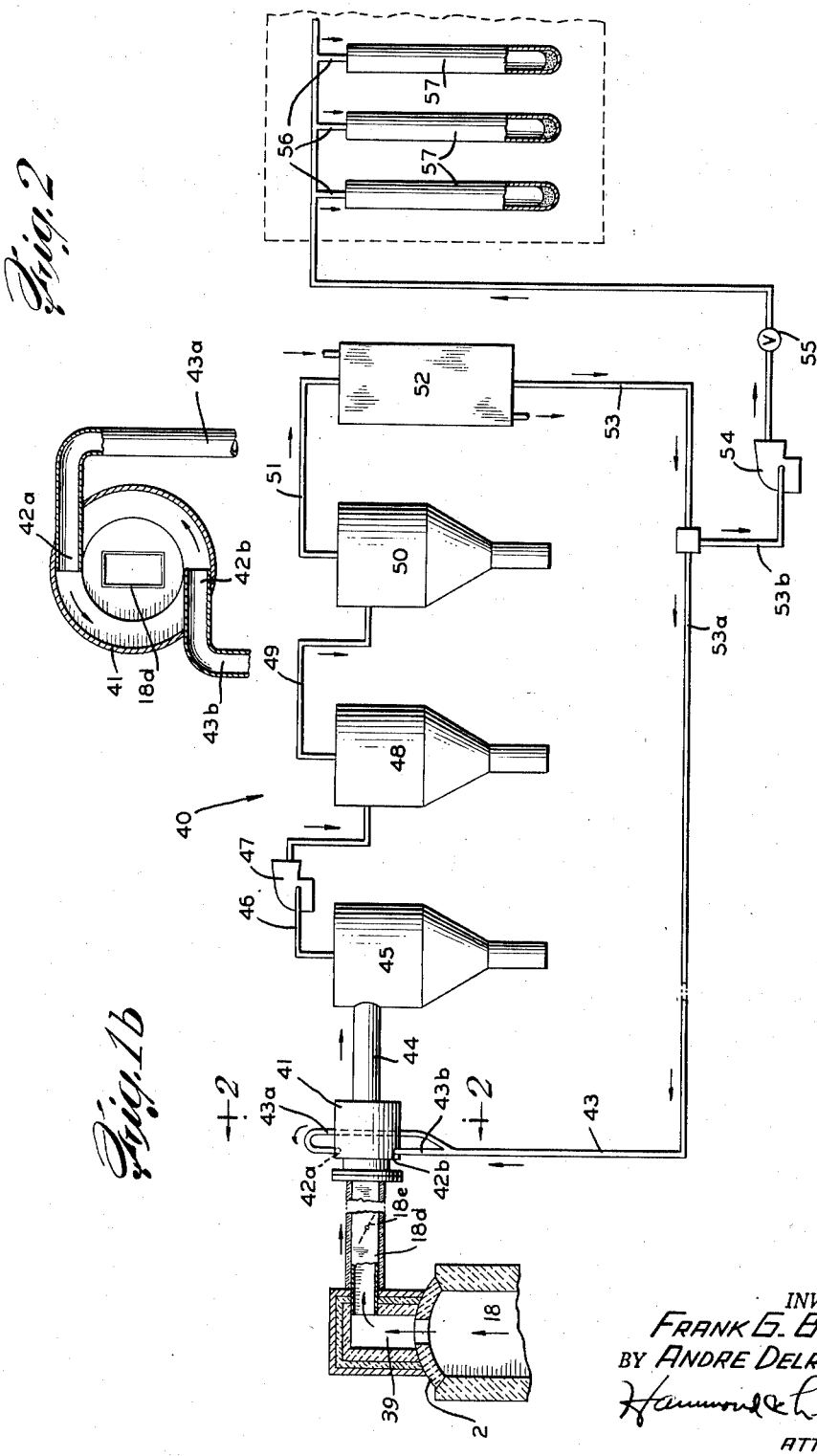

2,668,760

UNITED STATES PATENT OFFICE 2,668,760

CONTINUOUS PRODUCTION OF METALLIC ZINC FROM OXIDIC ZINC ORES

Frank G. Breyer, Wilton, Conn., and Andre Delruelle, Trooz, Belgium, assignors to Singmaster & Breyer, New York, N. Y., a copartnership Application February 24, 1949, Serial No. 78,024

9 Claims. (Cl. 75—88)

The present invention relates to a process for the continuous production of metallic zinc from oxidic zinc ores. It provides a process of continuous ore reduction under heat produced by the partial combustion of carbonaceous material in the presence of the ore, whereby hot reaction gases are generated in which the zinc is present as metallic vapor, though in low concentration with other gases containing carbon dioxide, and from which practically all the zinc is recovered directly in metallic form. It also provides a new system for continuously recovering condensed metallic zinc from the dilute zinc-laden gases produced by direct-firing ore reduction processes.

Most of the zinc in the world is produced by thermal reduction processes in which the necessary heat is furnished to a charge of mixed ore and reducing material through refractory retort walls, i. e., by external or indirect heating. In some installations a large number of small retorts is used inside a common furnace chamber. In others large vertical retorts are employed with separate external heating facilities for each retort. In the first case the operations are essentially of a discontinuous or batch character, they have attendant limitations with respect to the producing capacity of plant equipment and the costs of production, and working conditions disagreeable to laborers are entailed in discharging and recharging the retorts. In either case, the processes function efficiently only with the use of comparatively rich zinc ores or concentrates, which are rapidly diminishing in availability. And the necessity for transferring heat through refractory walls of large surface area imposes severe requirements upon the refractory material to be used, which must possess simultaneously a high degree of mechanical strength at high temperatures, maximum thermal conductivity, and good resistance to both abrasion and chemical corrosion.

The present invention has the general purpose of overcoming these limitations of the usual thermal reduction processes. Among its more particular objects are: To obtain increased heat efficiency and increased producing capacity in the production of metallic zinc from oxide ores. To make practical the use of poorer or low grade zinc ores for this purpose, as well as the usual rich ores or concentrates. To make practical the use of relatively low grade fuel. To reduce the unit cost of metallic zinc production. And to improve the working conditions and reduce the labor entailed.

The foregoing objects and other advantages are brought about according to this invention by making use of several correlatable principles which include:

First, that the operation of a zinc liberating furnace of the traveling grate type, which hitherto has served only for producing zinc-bearing gases of large zinc oxide content, can be converted to reducing conditions and made to serve as a most efficient manner of generating hot zinc-laden gases wherein the zinc is a stable metallic vapor, even though the vapor exists in low concentration in admixture with other hot gaseous products of the ore reduction and partial fuel combustion.

Second, that dilute zinc-laden gases of this character, when maintained quite hot and inaccessible to air or other external oxidizing agents, may contain as much carbon dioxide as needs be present in products of direct-firing reduction processes such as that of the traveling grate furnace, and limited amounts of water vapor as well, without appreciable re-oxidation of the zinc vapor occurring as long as the temperature of the gases is kept sufficiently elevated.

Third, that the zinc vapor content of such hot gases can be converted into a condensed metallic form, with little or no objectionable re-oxidation, by shock-chilling the gases from an elevated temperature while continuing the exclusion of air; and that this can be accomplished efficiently by combining the hot gases with enough cool non-oxidizing gas to chill the former abruptly to a temperature below the melting point of the zinc, so that the vapor forms collectible metallic dust in the combined gases. After collecting dust from these gases and further cooling them, a regulated amount of the cool gases either partially or completely stripped of zinc dust can be recirculated to serve wholly or in part as the non-oxidizing chilling gas in continuing operations of the process.

Fourth, as a general observation, the production of a metallic zinc product of low grade according to principles and with the achievement of objects as above mentioned affords vital advantages over conventional processes of metallic zinc production, even though the low grade product requires refinement before being used as a fabricating metal. In other words, in many practical situations now existing the importance of using various grades of ores or fuels with plant equipment of extraordinarily large producing capacity, and of operating at much greater heat efficiency and less expense than heretofore, far outweighs the cost of refining the low grade metallic product.

According to a preferred embodiment of this invention, a traveling grate furnace of known type is used in direct connection with a suitable chilling and collecting system that takes hot zinc-laden gases directly from the main reaction or zinc eliminating chamber of the furnace and completely excludes air or other external oxidizing gas from these gases, and the furnace is arranged and operated with a charge bed of fuel and ore blown by suitable oxidizing gas so as to generate hot zinc vapor-laden gases of reducing character into the eliminating chamber while excluding air or external oxidizing gas in other forms from the gas space of this chamber.

The operation is continuous and, in general, comprises reducing oxidic zinc ore in the presence of solid carbonaceous material through partial combustion of that material by suitable oxidizing gas delivered only to one side of the reacting mass; generating the resultant zinc-laden combustion and reduction gases in a reducing state into a heat-insulated chamber bordered by the opposite side of the reacting mass and heated by it to a temperature not substantially below the reaction temperature; maintaining the gases in said chamber in a reducing state so that practically all their zinc content is in metallic vapor form; and with complete exclusion of air taking off the reaction gases, chilling them abruptly from a temperature above the reversion or reoxidation temperature of the zinc in them to a temperature at which the zinc is condensed; and collecting the condensed metallic zinc. According to a preferred embodiment the shock-chilling and subsequent treatment of the gases are carried out in the manner already generally indicated above.

These and other features of a preferred embodiment of the invention will be explained in detail in the following description which refers to the accompanying schematic drawings, wherein:

Fig. 1a is a vertical longitudinal cross section through a traveling grate furnace adapted for the practice of this invention;

Fig. 1b is a diagram of a zinc condensing and collecting system directly connected with the main reaction chamber of the traveling grate furnace; and Fig. 2 is a vertical cross section through a reaction gas chilling chamber in said system, as viewed along line 2—2 of Fig. 1b.

The furnace 1 as shown has a construction generally similar to that of the traveling grate furnace heretofore used for producing zinc oxide from a traveling bed of fuel and ore briquets. It also resembles a conventional sintering machine, being operated on up-draft and having a long heat-insulating refractory hood 2 installed over the upper flight of a traveling grate 3 which runs continuously as an endless belt over wheels 4 and 5 at opposite ends of the hood. The traveling grate consists of a series or train of pallets 6 which form in the upper flight a moving horizontal support pervious to the draft blown through it from below but impervious to the briquets used in making up the charge.

The length of the hood 2 is divided into a number of individual sections or chambers by transverse refractory walls 10, 11, 12, 13, 14 and 15. Starting at the forward end where the grate enters there are, successively, a fuel ignition chamber 16, an ore ignition chamber 17, a main reaction or eliminating chamber 18, a dwindling chamber 19, and a "waste" chamber 20 which communicates with a discharge chamber 38 across the backward ends of the hood and grate.

Separate windboxes 16a, 17a, 18a, -b and -c and 19a and -b are arranged below the grate to deliver blasts upward into material on portions of the grate in chambers 16, 17, 18 and 19, respectively. Each windbox is separate from the others and has a separate blast intake 22 so that the rate of blowing for each chamber can be adjusted independently. The bottom portions of these boxes, furthermore, form containers for bodies of water $w$ by which the air streams entering at 22 may be humidified in passing to the grate. Another suitable way of humidifying the air is to inject a water mist or steam into the air supplied to the windboxes.

Along the transverse walls 10, 12, 13 and 14 at entrances to chambers 16, 17, 18 and 19, respectively, are vertically adjustable levelers 23, 24, 25 and 26 which are arranged to touch the surface of the bed of material moving beneath them on the grate, thus not only keeping the bed even but also substantially isolating the gases in each chamber. Separate gas offtakes 16d, 17d, 18d, 19d and 20d extend from the tops of the respective chambers for the removal of gaseous products, and the offtakes have dampers 16e, 17e, 18e, 19e and 20e which may be set to maintain all the chambers under a positive gas pressure that prevents entrance of air and minimizes leakage of gases from chamber to chamber.

A fuel hopper 30 is located at the front end of the furnace, with its mouth arranged to deliver fuel at 31 onto grate 3 where the grate enters the hood. A fuel layer 32 is thus formed on the grate at a depth determined by the setting of leveler 23. Briquets of coal or other solid carbonaceous material may be used, in a layer normally about 6" deep in the case of coal. If desired, the fuel briquets may contain a small proportion of zinc ore. Entering the fuel ignition chamber 16, this layer is thoroughsy ignited and is maintained continuously in ignited condition by a suitable air blast delivered through the grate from windbox 16a. The temperature of chamber 16 is thus held, for example, at about 1800° to 1900° F.

Upon leaving the fuel ignition chamber the grate carries the ignited fuel beneath an ore hopper 34 which has a lower section 35 inside the hood between transverse walls 11 and 12 so that some pre-heating of the ore material occurs in this section. Hopper 34 is supplied with briquets or lumps 36 of mixed ore and carbonaceous material. This mixture may contain, for example about 30 to 40% of coal or coke and 70 to 60% of calcined or sintered zinc concentrates. Other forms of zinc oxide-containing materials may be used, even with some added crude zinc metal or zinc dust if desired, and the fuel-ore ratio may be varied widely with different raw materials without departing from requirements of the furnace operation. The coal-ore mixture from hopper section 35 forms a layer 37 over the ignited fuel layer 32 at a depth determined by the setting of leveler 24. This layer normally may be about 6" deep in using briquets of the composition mentioned. The overall ratio of the weight of coal to that of ore in the complete bed formed by layers 32 and 37 is important to obtaining the required reducing gas composition. This ratio should be in excess of 1.0, and may be, for example, about 1.4 in preferred practices according to this embodiment of the process.

The complete charge bed now enters the ore ignition chamber 17, where the coal-ore briquets are thoroughly ignited by a suitable air blast blown through the grate from windbox 17a. The blowing is here regulated, for example, to hold the temperature of chamber 17 between about 1600° to 1700° F., so that ore briquet ignition occurs without excessive loss of zinc from the charge. Some ore reduction with evolution of zinc vapor occurs nevertheless at this temperature. For example, the gases formed and taken off at 17d may contain about 1 to 1.5% of metallic zinc vapor by volume. These gases may be combined with and treated as part of the main reaction gases produced in chamber 18, at the expense of some dilution, or they may be burned to marketable zinc oxide by blowing air into them in offtake 17d, say through an air port 17f.

In leaving chamber 17 to enter the eliminating chamber 18 the ignited bed consists of mixed fuel and ore in a gas pervious state and at an ore reduction temperature, with unburned fuel underlying the ore. The active reduction of the ore is brought about in chamber 18 under conditions to be described in particular farther below.

At this point it may be explained that the travel of the grate 3 through chamber 18 is regulated in relation to the length of this chamber and the amounts of reactive materials so that most of the zinc content of the charge will have been liberated in chamber 18, and so that zinc oxide appears in the generated gases only in small amount at the tail or backward end of this chamber where the charge is approaching chamber 19. Thus the charge may enter the dwindling chamber 19 with about 85 to 90% of its zinc content eliminated. In entering chamber 19 it passes under the isolating leveler 26, and while in chamber 19 it is blown with excess air from windboxes 19a and 19b in order to remove as much as possible of the remaining zinc. The charge in chamber 19 therefore becomes disrupted by blow holes, and zinc oxide is produced in the reaction gases. Whatever zinc vapor these gases contain may be oxidized to marketable zinc oxide by means of air admitted either through port 19f above the charge bed or through a port 19g in the gas offtake 19d.

The burned out charge leaving the dwindling chamber passes under another isolating leveler 20b and is finally discharged over the backward end of the traveling grate into chamber 38. Dust and smoke incident to discharging are carried off through chamber 26 and its offtake stack 20d. The spent material at 38 consists of a small amount of clinker, a relatively large amount of coal fines, and unfused gangue material from the ore. It contains not more than about 1 to 3% of zinc. Recovery of its unburned fuel content is possible by a number of known separating processes.

By operating the traveling grate furnace with a charge of the nature mentioned the zinc content of the ore may be converted, for example, about 85% into metallic vapor and about 10% into marketable zinc oxide, while about 5% remains unreduced in the spent material. The metal distribution between chambers is, for example, approximately as follows:

| Chamber | Percent of Total | | |
|---|---|---|---|
| | Zn | Cd | Pb |
| Ore Ignition | 3–5 | 40–50 | 10–15 |
| Eliminating | 80–85 | 45–50 | 70–80 |
| Dwindling | 10–12 | 5–7 | 5–10 |
| Discharge | 3–5 | 1–2 | 1–2 |

Referring now in particular to the operation of the main reaction or elimination chamber 18, the thoroughly ignited charge bed enters this chamber from beneath the isolating leveler 25, and in a forward part of the long chamber 18 humidified or moisture-laden air is blown into the bed from the windbox 18a below so as to raise the temperature of the charge quickly to about 2000° F. or higher. The rate of blowing is controlled, and is reduced as the reacting material progresses along the chamber, through independent control of the humidified drafts delivered from the successive windboxes 18b and 18c, in order to insure against blow holes appearing in the bed so that only the reaction gases rising from its upper side have access to the gas space of the chamber. Along the tail or backward portion of the chamber over windbox 18c the air blast is sharply reduced, the conditions being regulated as above mentioned so that, at most, only a small amount of zinc oxide appears in the reaction gases generated near the exit of the charge.

The moisture-laden air blown into the lower side of the bed should contain more than 2% of water vapor by volume, and a considerably greater humidification is preferred in most cases. The moisture content of the blast should be increased with increasing oxidizing power of the blast, such as, for example, when blowing the charge with oxygen-enriched air instead of atmospheric air. The amount of blast is regulated in relation to the movement and the composition of the bed so that the gases generated into chamber 18 by the partial combustion and reduction reactions possess a definite reducing character. Air or free oxygen in other forms is positively excluded from the gas space of the chamber by keeping it closed and under positive pressure from the reaction gases. Under these and the described high temperature conditions, the metallic zinc vapor liberated from the bed does not undergo oxidation by the carbon dioxide and water vapor which accompany it in the reaction gases. Furthermore, the zinc oxide contained in the gases generated at the tail of the chamber is re-reduced over the bed under the reducing conditions maintained there, which is made certain by drawing these gases forward in the reaction chamber in countercurrent relation to the charge. For that purpose the offtake 18d may be located at the forward end of the chamber 18, and thus the tail gases must flow countercurrent to the bed through the zone of strongest reducing action in reaching their outlet.

Accordingly, zinc-laden gases of reducing character are produced in and taken off from chamber 18 at elevated temperatures, with practically all their zinc content present as stable metallic vapor. In practice under conditions as mentioned above for example, the composition of the effluent gases is approximately, by volume, 10 to 11% of carbon dioxide, 12 to 13% of carbon monoxide, 5 to 7% of hydrogen, 3 to 4% of water vapor, 3 to 5% of zinc vapor and the balance essentially of nitrogen.

In passing to offtake 18d the hot reaction gases first ascend through a heat-insulated column 39 forming a vertical extension of chamber 18, where their velocity is reduced so that dust and fine ashes may settle out of the gas stream. Then the gases pass through heat-insulated offtake 18d to the chilling and zinc collecting system, of which a preferred form is illustrated and indicated generally at 40 in Fig. 1b.

Although the metallic zinc vapor in the hot reaction gases from the furnace is stable as long as the gases are kept at sufficiently elevated temperatures, when cooling the gases toward the dew point of the zinc the zinc tends to be reoxidized by both carbon dioxide and water vapor present. In order to prevent this reoxidization, which forms zinc oxide, the hot gases are shock-chilled to condense the zinc abruptly to metallic form, and this may be done advantageously by conducting them through offtake 18d directly into a shock-chilling or mixing chamber 41 where non-oxidizing gas is added to bring their temperature immediately below the melting point of the zinc. Some preliminary cooling may be effected, if desired, although the gases preferably are brought into the shock-chilling chamber at a temperature as near as practicable to the temperature in the reaction chamber. In any case they must continue to be non-oxidizing to their zinc content above a limiting temperature which varies with their composition, this temperature being relatively higher with increasing concentrations of zinc vapor or with decreasing ratios of CO to $CO_2$ or of hydrogen to water vapor in the gases. In operations making use of air blasts according to this embodiment, the limiting temperature for entry of the reaction gases into the chilling chamber generally lies above 1750° F., the ratio of CO to $CO_2$ in the gases should exceed 1.0, and the ratio of hydrogen to water vapor should exceed 1.2.

The chamber 41 as shown is of cylindrical form but may be modified to the form of a cone or other hollow body of revolution. The reaction gases enter and leave along its axis. It has a volume large enough to hold both the reaction gas stream and an inflow of cool non-oxidizing gas sufficient to chill the reaction gases to a temperature below the melting point of the zinc; which chilling gas is introduced continuously through tangentially directed inlets 42a and 42b, of the same hand, arranged oppositely in the side wall of the chamber. The chilling gas is supplied to these inlets through branches 43a and 43b of conduit 43. At the outset of operations this gas may be any available inert or reducing gas at a suitable low temperature, while in continuing operations it is composed wholly, or in large part, of cool residual gases obtained and recirculated from the zinc collecting system as hereinafter described.

In the mixing chamber 41 the incoming hot reaction gases are combined intimately with a whirling blanket of the cool non-oxidizing gas introduced through inlets 42a and 42b, and thus they are shock-chilled almost instantaneously to a temperature below the melting point of the zinc. In this way the zinc vapor is converted abruptly into zinc dust. The nascent dust and droplets or particles of zinc approaching a solidified form are prevented by the whirling blanket from sticking to surfaces of the chamber, where otherwise they would tend to adhere and not only clog the passageway but also become oxidized by persistent contact with reactive components of the incoming hot gases. The chilling gas in the whirling blanket becomes intermingled with the reaction gases so that thermal equilibrium between all particles of solids and gas present is quickly established and exists in the gas stream leaving the mixing chamber. Furthermore, the zinc dust forms in a well flocculated state such that most of it generally can be collected efficiently by passing this stream through cyclonic type separators.

The combined gases containing the zinc dust in suspension therefore are conducted from the chilling chamber 41 through its offtake conduit 44 directly into a cyclone collection system. They pass first into cyclone 45, thence through conduit 46 containing blower 47 into a second cyclone 48, and thence through conduit 49 into a third cyclone 50. The cyclones are completely closed to exclude air. Most of the zinc dust generally is collected in them. The residual gases, which still contain very fine zinc dust in suspension, are then conducted through conduit 51 into a heat exchanger 52 where they are cooled further to a low temperature suitable for stripping out the remaining zinc dust in filter bags.

The cooled gas stream leaves the heat exchanger through a conduit 53 which is divided into two branches. One branch 53a connects with the chilling gas supply conduit 43 of the mixing chamber 41, so that a regulated amount of the cool residual gas is recirculated directly into the mixing chamber to serve as the non-oxidizing gas for chilling reaction gases that continue to flow from the furnace.

The other branch 53b extends through a blower 54, and thence through a throttle valve 55 and into a bag house where the remaining portion of the cooled gases flows through conduits 56 directly into suitable bag filters 57, for completion of the fume collection.

The conduits 43, 46, 49, 51, 53 and 56 are shown diagrammatically, it being understood that their actual sizes are adapted to handle the volumes of gases passing through them.

An alternative arrangement is to connect the heat exchanger offtake 53 directly with the bag filters and to recirculate cool gas completely stripped of dust from the bag house to the mixing chamber 41, after passage of the gas through the bag filters. This, however, requires the use of a tightly closed bag house. It is imperative that air be excluded from the entire gas circulation system.

The zinc dust collected in the cyclones according to the practice described amounts, for example, to about 60% of the zinc content of the furnace gases. Substantially all the remainder of the zinc dust is collected in the filter bags. The metallic zinc collected by this method undergoes only a very slight degree of oxidation, so that the ratio of metallic to total zinc in the product generally exceeds 94%. A metallic zinc product of this degree of purity can be melted and cast into low grade slab zinc, or it can be refined readily into high purity zinc.

It will be understood that the new features of process operation and plant construction herein disclosed and set forth in the appended claims may be employed in ways and forms different from those of the preferred embodiments described above and illustrated in the drawings without departing from the contributions of this invention.

We claim:

1. A process for the production of metallic zinc which comprises providing a gas-pervious ignited bed of mixed carbonaceous fuel and oxidic zinc ore, wherein such fuel underlies mixed fuel and ore, in a furnace chamber having a heat-insulated gas space over the bed, therein blowing into said bed enough oxygen-containing gas to burn the fuel partially and produce heat sufficient for active reduction of the ore, thus generating into said space hot combustion and reduction gases of reducing character of which the zinc content consists practically entirely of metallic vapor in low concentration, excluding free oxygen from said space and maintaining the gases in said space reducing to the zinc content and not substantially below the reaction temperature, and, while excluding external oxidizing gas, conducting the hot gases in such reducing state from said space directly into a condenser and there chilling the gases abruptly to a temperature at which the zinc vapor therein condenses to a substantially unoxidized metallic form.

2. A process for the continuous production of metallic zinc from oxidic zinc ore which comprises: passing a gas-pervious ignited bed of mixed carbonaceous fuel and ore at an ore reduction temperature, and wherein such fuel underlies mixed fuel and ore, through a furnace chamber having a gas space over the bed; blowing oxygen-containing gas into the bed in said chamber from below the bed to burn the fuel partially and produce enough heat for active reduction of the ore, thereby generating into said space hot combustion and reduction gases containing the zinc as vapor in low concentration; substantially excluding free oxygen from said space and maintaining the gases therein at a temperature sufficient to keep them in a reducing state to the zinc content; taking them off as hot gases having practically all their zinc content in metallic vapor form; and with continued exclusion of free oxygen immediately shock-chilling the gases from a temperature at which substantially all their zinc content is vaporized to a temperature below the melting point of the zinc therein, so as to convert the zinc vapor abruptly into substantially unoxidized zinc dust, and collecting zinc dust from the chilled gases.

3. A process for the continuous production of metallic zinc from oxidic zinc ore which comprises, continuously: passing a gas-pervious ignited bed of mixed carbonaceous fuel and ore at an ore reduction temperature, and wherein such fuel underlies mixed fuel and ore, through a furnace chamber having a gas space over the bed; blowing humidified air into the bed in said chamber from below the bed to burn the fuel partially and produce enough heat for active reduction of the ore, thereby generating into said space hot combustion and reduction gases of reducing character containing the zinc as vapor in low concentration; excluding free oxygen from said space and maintaining the zinc content of the gases therein in metallic vapor form by the heat and the reducing products of the continued burning in said bed; and withdrawing from said space hot gases having practically all their zinc content in metallic vapor form.

4. A process as described in claim 3, the burning being regulated so that the bed is heated to at least 2000° F. in said chamber.

5. A process for the continuous production of metallic zinc from oxidic zinc ore which comprises, continuously: passing a gas-pervious ignited bed of mixed carbonaceous fuel and ore at an ore reduction temperature, and wherein such fuel underlies mixed fuel and ore, through an elongated furnace chamber; blowing humidified air into the bed in said chamber from below the bed to burn the fuel partially and produce enough heat for active reduction of the ore, thereby generating into space of said chamber over the bed hot combustion and reduction gases of reducing character containing the zinc as vapor in low concentration; excluding free oxygen from said space and maintaining the gases therein at a temperature sufficient to keep them non-oxidizing to the vapor; regulating the movement and the blowing of the bed so that a small amount of zinc oxide appears in said generated gases only near the exit of the bed; reducing said zinc oxide by drawing gases containing it over and countercurrent to the bed in said space; and conducting from said space hot reaction gases having practically all their zinc content in metallic vapor form.

6. A process as described in claim 5, said humidified air being blown into the bed relatively strongly along a forward portion of said space to form strongly reducing gases from the fresh entering bed, and being blown at a dimensioned rate along a backward portion of said space.

7. A process for the continuous production of metallic zinc from oxide zinc ore which comprises, continuously: passing a gas-pervious ignited bed of mixed carbonaceous fuel and ore at an ore reduction temperature, and wherein such fuel underlies mixed fuel and ore, through a furnace chamber having a gas space over the bed; blowing humidified air into the bed in said chamber from below the bed to burn the fuel partially and produce enough heat for active reduction of the ore, thereby heating the bed in said chamber to a temperature of at least 2000° F. and generating into said space hot combustion and reduction gases of reducing character containing the zinc as vapor in low concentration; excluding free oxygen from said space and maintaining the zinc content of the gases therein in metallic vapor form by the heat and the reducing products of the continued burning in said bed; withdrawing from said space hot gases having practically all their zinc content in metallic vapor form; and with the continued exclusion of free oxygen immediately shock-chilling the gases from a temperature of at least 1750° F. to a temperature below the melting point of the zinc therein, so as to convert the zinc vapor abruptly into substantially unoxidized zinc dust, and collecting zinc dust from the chilled gases.

8. A process for the continuous production of metallic zinc from oxidic zinc ore which comprises, continuously: passing a gas-pervious ignited bed of mixed carbonaceous fuel and ore at an ore reduction temperature, and wherein such fuel underlies mixed fuel and ore, through a furnace chamber having a gas space over the bed; blowing humidified air containing more than 2% of water vapor into the bed in said chamber from below the bed to burn the fuel partially and produce enough heat for active reduction of the ore, thereby generating into said space hot combustion and reduction gases of reducing character containing the zinc as vapor in low concentration of about 3 to 5%; excluding free oxygen from said space and maintaining the zinc content of the gases therein in metallic vapor form by the heat and the reducing products of the continued burning in said bed; withdrawing from said space hot gases having practically all their zinc content in metallic vapor form, the ratio of $CO$ to $CO_2$ in said gases exceeding 1, the ratio of $H_2$ to $H_2O$ therein exceeding 1.2, and their temperature being above 1750° F., and with the continued exclusion of free oxygen immediately shock-chilling the gases from a temperature of at least 1750° F. to a temperature below the melting point of the zinc therein, so as to convert the zinc vapor abruptly into substantially unoxidized zinc dust, and collecting zinc dust from the chilled gases.

9. A process for the continuous production of metallic zinc from oxidic zinc ore which comprises, continuously: passing a gas-pervious ignited bed of mixed carbonaceous fuel and ore at an ore reduction temperature, and wherein such fuel underlies mixed fuel and ore through a furnace chamber having a gas space over the bed; blowing humidified air containing more than 2% of water vapor into the bed in said chamber from below the bed to burn the fuel partially and produce enough heat for active reduction of the ore, thereby generating into said space hot combustion and reduction gases of reducing character containing the zinc as vapor in low concentration of about 3 to 5%; excluding free oxygen from said space and maintaining the zinc content of the gases therein in metallic vapor form by the heat and the reducing products of the continued burning in said bed; and withdrawing from said space hot gases having practically all their zinc content in metallic vapor form, the ratio of CO to $CO_2$ in said gases exceeding 1, the ratio of $H_2$ to $H_2O$ therein exceeding 1:2, and their temperature being above 1750° F.

FRANK G. BREYER.
ANDRE DELRUELLE.

References Cited in the file of this patent

UNITED STATES PATENTS

| Number | Name | Date |
|---|---|---|
| 852,440 | Laval | May 7, 1907 |
| 976,557 | Dawson | Nov. 22, 1910 |
| 1,172,321 | Timm | Feb. 22, 1916 |
| 1,652,184 | Skogmark | Apr. 9, 1925 |
| 1,895,879 | Bunce et al. | Jan. 31, 1933 |
| 1,896,221 | Bunce | Feb. 7, 1933 |
| 1,983,025 | Ginder et al. | Dec. 4, 1934 |
| 2,046,402 | Ogg | July 7, 1936 |
| 2,109,841 | Hansgirg | Mar. 1, 1938 |
| 2,144,914 | Debuch | Jan. 24, 1939 |
| 2,207,779 | Breyer | July 16, 1940 |
| 2,238,908 | McConica | Apr. 22, 1941 |
| 2,263,751 | Avery | Nov. 25, 1941 |